United States Patent Office 3,096,272
Patented July 2, 1963

3,096,272
NOBLE METAL COATED TITANIUM ELECTRODE AND METHOD OF MAKING AND USING IT
Henri Bernard Beer, The Hague, Netherlands, assignor, by mesne assignments, to Amalgamated Curacao Patents Company N.V., Willemstad, Curacao, Dutch Antilles, a limited-liability company
No Drawing. Filed Oct. 20, 1958, Ser. No. 768,046
Claims priority, application Netherlands Oct. 24, 1957
5 Claims. (Cl. 204—290)

In co-pending patent application 724,499 an electrode is described which consists of a core of a base metal provided with a coating of a noble metal or another electricity conducting resistant material, which core is provided with a barrier layer in those places where the coating is porous.

Said barrier layer may be previously applied electrolytically and in the case of a core of aluminium it consists e.g. of alumina or aluminium fluoride and in the case of a core made from titanium said barrier layer consists e.g. of titanium oxide.

Afterwards I have found that such an electrolytically formed barrier layer is not always satisfactory because the ohmic resistance of the material on which the barrier layer is formed (also in case the barring is incomplete i.e. in case of an insufficient chemical sealing) is so many times greater than that of the conducting coating that, especially in the fine pores not sufficient energy can be supplied to build up a barrier layer which provides a sufficient chemical protection. This is especially to be expected when using electrolytes which together with the metal on which the barrier layer is to be formed, will produce compounds which only after hydrolysis produce the oxide forming the barrier layer. Examples of such electrolytes are hydrohalic acids or salts thereof. The fact has been established that owing to the absorptive capacity of the fine pores in the coating there is a possibility that the concentrated anolytes will accumulate in said pores so that the base core or carrier metal may be chemically attacked.

Furthermore I have found in actual practice that the barring effect of an electrolytically formed barrier layer is to be built up again to a slight extent each time when the current is switched on again after it has been switched off. It will be found that after the switching off of the current the ohmic resistance in the reverse (non-conducting) direction of the layer has dropped to below the value that is desired. This desired minimum, however, will be reached again in a few seconds after the current has been switched on. The explanation of this phenomenon is presumably to be found in the fact that an electrolytically built up barrier layer has a slight excess of oxygen in its lattice, which oxygen gets lost when the current is interrupted, so that the resistance of the layer decreases. (The more oxygen is bound to the material of the barrier layer the greater the resistance is.) The supply of current, however, will soon replenish the amount of oxygen that has got lost.

For the correct operation of the electrode this change of the resistance and the concomitant change of the chemical resistance during the rest pauses may be dangerous as it will make the electrode vulnerable.

I have now found that these disadvantages of the electrolytically formed barrier layer may be eliminated by building up said layer chemically or thermally or by a combination of these two treatments. It is then possible also to provide the smallest pores with a protective layer, while it is also possible to form protective layers from other compounds having a greater resistance than the oxides or fluorides of the metals. According to the invention it is possible, for example in a simple and reliable manner to form stable, chemically substantially inert compounds of the core metal, such as nitrides, carbides etc.

A layer formed according to the invention will impart, through the pores of the conducting noble metal coating, an absolute resistance against substantially all chemical substances to the core metal. The barrier layer thus formed is not porous either. This effect can be achieved by forming the compounds at such a temperature that the layer will more or less sinter so that its surface will close, as it were. A close layer thus sintered cannot be obtained by electrolysis alone. In addition the adherence of this layer to the metal may even be improved by gradually cooling the electrode after the formation of the protective layer.

In case the current is interrupted the ohmic resistance, which is typical of the chemical resistance, substantially does not decrease. Also in case according to the invention the oxide of the metal is formed the oxygen is found to strongly adhere to the metal. Of the base metals suitable as core or carrier material titanium, niobium, tantalum and chromium are of importance i.a., the nitrogen compounds of which, so the nitrides, are substantially free from attack by chemicals. When using the oxygen compounds it is of importance for the oxides to have the correct crystal form. Furthermore the fluorides of metals such as aluminium, nickel etc. may be formed, which fluorides are also very resistant. Generally speaking all those metals can be used as core or carrier metal that by means of a chemical-thermal treatment can be converted into compounds having a high chemical resistance.

The chemical conversion of the carrier metal during which conversion the desired compound can be formed through the pores of the noble metal, can take place in combination with the thermal treatment. It is also possible to carry out the thermal treatment apart from the chemical conversion.

The thermal treatment may cause the compounds formed to sinter and thus to adhere better. Furthermore gases adsorbed on one of the metals e.g. after the cathodic precipitation of the noble metal coating, may be expelled by the thermal treatment, so that they can no longer exert a harmful influence. Another effect of the thermal treatment may reside in the conversion of a compound into another more desirable crystal form. Thus I have found, for example, that the titanium dioxide formed by heating titanium in the presence of air will change into the rutile form when it is subjected to a further heating treatment, which rutile form is chemically the most resistant one. In some cases an extremely thin layer of oxide is already present on the metal as commercially available, which oxide is only converted into another, more stable form by the thermal treatment.

The resistant coating e.g. of noble metal may be applied to the non-resistant core or carrier metal, which is mostly a base metal, in various known manners. This may be effected by electroplating or chemical deposition, atomization, cathodic atomization, rolling or by ultrasonically welding extremely thin foils of noble metal to one or both sides of the core metal. The resulting cores have an incomplete or porous coating thereon. It is also possible to start from an extremely thin foil of noble metal and to galvanically apply thereto a layer of the carrier metal, which subsequently is brought into the desired inert condition according to the invention in the places where the noble metal is porous. The non-coated side of the base metal is also rendered entirely inert during this treatment.

When using e.g. titanium as a core or carrier metal, it is possible, for economical reasons, to precipitate a thin layer thereof on iron e.g. galvanically and to rhodanize this iron titanium. By sintering the electrode in an atmosphere of oxygen or nitrogen the titanium will flow about the iron without any pores being left in the titanium, while at the same time the nitride or oxide of titanium is formed in the places where the rhodium coating is porous.

The formation of the nitride of the base metal, e.g. titanium, can be effected by heating it in a mixture of ammonia and nitrogen or of ammonia and air. It is advisable to maintain this atmosphere during the gradual cooling.

The electrodes manufactured according to the invention may be used for carrying out electrolyses both in aqueous solutions and in organic electrolytes in the heat or in the cold. They may also be used for electrolysing salt melts.

It should be noted that the chemically resistant coating may consist of magnetite instead of being formed from a noble metal, which magnetite is chemically inert and is a sufficiently good conductor for electricity.

The invention will be further elucidated with reference to the following examples. Said examples, however, should not be taken as limiting the invention in any respect.

*Example 1*

A plate of titanium is degreased in petrol. Subsequently it is pickled for one minute in a solution of 60 parts by weight of water, 20 parts by weight of nitric acid and 3 parts by weight of sodium fluoride of 50° C. Subsequently it is rinsed with clean water and suspended for 10 minutes in a solution of 80 parts by weight of (100%) acetic acid and 20 parts by weight of ammonium bifluoride. The plate is then connected to a source of alternating current, a plate of titanium being used as the other electrode. The voltage of this alternating current is raised to 10 volts and subsequently the first mentioned plate is taken out of the solution, rinsed well and galvanically rhodanized in one of the conventional baths. The plate of titanium is covered then with an extremely thin, but well adhering layer of rhodium. Subsequently the plate is well dried and placed in an oven into which a mixture of ammonia gas and nitrogen is blown. The temperature is gradually raised to 700° C., at which temperature the plate is kept for 4 hours, while continuously a mixture of ammonia and nitrogen is blown into the oven. Subsequently the plate is very gradually cooled, while continuously ammonia and nitrogen are supplied.

The plate thus treated is placed in a mixture of 50% sulphuric acid and water and subjected to a current density of 50 m. amp. per square cm. (ohmic resistance of this electrode is substantially equal to that of an electrode of solid platinum). After 300 hours of operation the electrode does not yet show any signs of damage. Under the same conditions a normal plate of titanium coated with rhodium will stop operating already after 20 hours.

The above plate of titanium is also placed in an aqueous solution of 5% sodium bromide acidified with hydrobromic acid to pH 2. Under the same conditions as described above this plate does not show any signs of damage either after 300 hours of operation. A plate of titanium coated with rhodium, which has not been subjected to the pre-treatment described hereinbefore, will decompose after 10 hours of operation in this electrolyte.

*Example 2*

A plate of titanium is coated with rhodium in the same manner as described in Example 1. Subsequently it is introduced for four minutes in an atmosphere of helium at 400–500° C. as a result of which the rhodium will better adhere to the titanium. Subsequently the plate is cooled and is kept in an oven at a temperature of 800° C. in air or in another mixture richer in oxygen for 15 minutes, so that the titanium will change into titanium dioxide in the porous places. Subsequently the plate is slowly cooled in the same atmosphere. The electrode obtained is excellently suited for use in acid, neutral or alkaline electrolytes.

*Example 3*

A plate of titanium is coated with rhodium in the same manner as described in Example 1. Subsequently it is exposed to the action of chlorine for 15 minutes at a temperature of 300° C., so that in the pores and the other uncoated places titanium tri-chloride will form. Subsequently it is gradually cooled and exposed at room temperature (20° C.) to gaseous ammonia. In the places covered with titanium tri-chloride titanium ammonium chloride will form. Thereupon the plate is gradually heated to 400° C. and kept at this temperature for 2 hours, whereupon it is gradually cooled. The advantage of first forming titanium ammonium chloride in the porous places is that the desired non-porous nitride can be formed then at a much lower temperature, while the adherence is extraordinarily good. The examples in which titanium is used can be repeated in practically the same manner with tantalum, niobium, chromium, etc., while naturally all kinds of variations in coating, temperatures, etc. are possible.

*Example 4*

An extremely thin foil of platinum is elecro-plated on one side with chromium until the whole has sufficient mechanical strength. Subsequently this chromium-platinum plate is introduced in an oven and kept for 6 hours at a temperature of 650° C., while a mixture of ammonia and nitrogen is blown into the oven. After slowly cooling in the same atmosphere the chromium in those places where it is not coated by the platinum is converted into chromium nitride to a certain depth, which nitride has a very high chemical resistance. The electrical conducting properties of this plate are excellent.

*Example 5*

A plate of nickel is coated with an extremely thin layer of rhodium in the conventional manner. Subsequently this plate is placed in an electrolyte of 80% by weight of (100%) acetic acid and 20 parts by weight of anhydrous ammonium bifluoride. A similar plate is now used as second electrode and to both electrodes an alternating current of 6 volts is applied and this voltage is maintained for 6 minutes. Subsequently the plates are taken from the electrolyte, substantially not rinsed, dried and heated for two hours at 70° C. The plate is then introduced into an oven and in an atmosphere poor in oxygen it is heated for two hours at 700° C. In the places where the nickel is not coated by rhodium (pores, edges) nickel fluoride will form which is highly resistant. This electrode is excellently suited for use in acid electrolytes.

*Example 6*

A plate of titanium is pre-treated in the manner as described in Example 1 and subsequently a layer of iron is applied preferably by electroplating, in the conventional manner. Subsequently the plate is placed in an oven and kept for 5 hours at a temperature of 1150° C., while oxygen is supplied. All of the iron will be converted then into magnetite and will be sintered onto the subjacent titanium, so that a well adhering, substantially non-porous layer is formed which is a good conductor for electricity. In the non-coated places the titanium is converted in titanium dioxide which is in the chemically very resistant rutile form. This electrode is excellently suited for use as an anode in alkali metal chloride electrolyses.

*Example 7*

A plate of titanium is coated with rhodium or another noble metal in the manner already described. Subsequently it is placed as an anode in an electrolyte consisting of 80% by weight of phosphoric acid, 10% by weight of sulphuric acid (98%) and 10 parts by weight of water.

A plate of lead is used as cathode, the voltage is gradually raised to 10 volts. A layer of titanium oxide will form in the pores of the noble metal on the titanium. The treatment takes about 10 minutes. The plate is rinsed well, dried and subsequently placed in an oven in which the temperature is raised to 800° C. After this temperature has been maintained for one minute the oven is allowed to cool gradually. Care is taken that during the heating fresh air cannot enter the oven. Subsequently the plate is taken from the oven and it is ready for use. The heat-treatment of the oxide first obtained electrolytically has resulted in a layer which is much more resistant than the layer formed electrolytically.

I claim:

1. A method of producing an electrode comprising applying a thin porous coating of rhodium to a core of titanium, heating the thus coated electrode in an atmosphere of helium at a temperature of from 400–500° C. for a period of 4 minutes, cooling the electrode, firing the electrode in an atmosphere of air at a temperature of 800° C. for 15 minutes, and slowly cooling the thus fired electrode, whereby the pores in the noble metal coating have formed therein a film of titanium oxide in rutile form which has great corrosion resistance.

2. A method of producing an electrode comprising applying a thin porous coating of rhodium to a core of titanium, placing the thus plated core as an anode in an electrolyte comprised of 80% phosphorus acid, 10% of sulphuric acid of a strength of 98% and 10% of water, placing a lead cathode in said electrolyte, applying a voltage to said electrolyte and gradually raising it over a period of 10 minutes to a voltage of 10 volts, removing said electrode from said electrolyte and rinsing it and drying it, firing said electrode at a temperature of 800° C. for a period of 1 minute in an atmosphere of air, and cooling said electrode slowly, whereby the pores in the noble metal coating have formed therein a film of titanium oxide in rutile form which has great corrosion resistance.

3. A method of producing an electrode comprising applying a thin porous coating of rhodium to a core of titanium, firing the thus coated electrode in an atmosphere of air at a temperature of 800° C. for 15 minutes, and slowly cooling the thus fired electrode whereby the pores in the rhodium metal coating have formed therein a film of titanium oxide in rutile form which has great corrosion resistance.

4. A method of producing an electrode, comprising incompletely coating a core of titanium with a noble metal, firing the thus coated electrode in an atmosphere containing a gas taken from the group consisting of oxygen at from 800° C. to 1150° C. and a nitrogen containing gas at from 400° C. to 700° C., and thereafter cooling the fired electrode slowly in the same atmosphere, whereby the parts of the core which are not coated with the noble metal have formed thereon a protective film of high corrosion resistance.

5. An electrode consisting essentially of a core of titanium and a coating of a noble metal thereon and having pores therein, each pore having therein a film of titanium oxide in rutile form produced by heating the noble metal coated electrode in an oxygen containing atmosphere at an elevated rutile oxide-forming temperature for a time sufficient to produce the rutile form of titanium oxide in the pores of the noble metal coating as a protective film which has high corrosion resistance.

References Cited in the file of this patent

UNITED STATES PATENTS

| | | |
|---|---|---|
| 1,077,920 | Stevens | Nov. 4, 1913 |
| 1,477,099 | Baum | Dec. 11, 1923 |
| 2,631,115 | Fox | Mar. 10, 1953 |
| 2,719,797 | Rosenblatt | Oct. 4, 1955 |
| 2,868,702 | Brennan | Jan. 13, 1959 |
| 2,943,031 | Wainer | June 28, 1960 |
| 2,955,999 | Tirrell | Oct. 11, 1960 |

OTHER REFERENCES

Cotton: "Platinum-Faced Titanium for Electrochemical Anodes," Platinum Metals Review, vol. 2, April 1958, pages 45 to 47.